US012693460B2

(12) United States Patent
Ishimaru et al.

(10) Patent No.: US 12,693,460 B2
(45) Date of Patent: Jul. 28, 2026

(54) OPTICAL FILM, DISPLAY DEVICE, AND COMPOSITION FOR FORMING COLORED LAYER

(71) Applicant: TOPPAN INC., Tokyo (JP)

(72) Inventors: Yoshiko Ishimaru, Tokyo (JP); Kai Futamata, Tokyo (JP)

(73) Assignee: TOPPAN INC., Tokyo (JP)

( * ) Notice: Subject to any disclaimer, the term of this patent is extended or adjusted under 35 U.S.C. 154(b) by 410 days.

(21) Appl. No.: 18/223,420

(22) Filed: Jul. 18, 2023

(65) Prior Publication Data

US 2023/0358930 A1 Nov. 9, 2023

Related U.S. Application Data

(63) Continuation of application No. PCT/JP2021/026616, filed on Jul. 15, 2021.

(30) Foreign Application Priority Data

Jan. 19, 2021 (JP) ................................ 2021-006752

(51) Int. Cl.
*G02B 5/20* (2006.01)
*B32B 7/023* (2019.01)
(Continued)

(52) U.S. Cl.
CPC .............. *G02B 5/208* (2013.01); *B32B 7/023* (2019.01); *G02B 1/115* (2013.01); *G02B 1/14* (2015.01);
(Continued)

(58) Field of Classification Search
CPC ........... G02B 1/115; G02B 1/14; B32B 7/023; B32B 2307/4026; B32B 2551/00
(Continued)

(56) References Cited

U.S. PATENT DOCUMENTS 6,307,671 B1 * 10/2001 Yabuki .................. G02B 5/201 252/588
2002/0025425 A1 * 2/2002 Kawazu ................ C03C 17/008 428/323

(Continued)

FOREIGN PATENT DOCUMENTS

CN 107430225 A 12/2017
JP H11-231301 A 8/1999

(Continued)

OTHER PUBLICATIONS

European Partial Supplementary Search Report issued in corresponding European Patent Application No. 21921113.3 dated Oct. 15, 2024 (18 pages).

(Continued)

*Primary Examiner* — Bumsuk Won
*Assistant Examiner* — Seth D Moser
(74) *Attorney, Agent, or Firm* — Foley & Lardner LLP

(57) ABSTRACT

An optical film includes a substrate, an optical function layer, and a colored layer. The substrate has an ultraviolet shielding rate of 85% or higher according to JIS L 1925. The optical function layer is formed on a first surface side of the substrate. The colored layer is formed on a second surface side. A difference ΔE*ab between chromaticities before and after a lightfastness test is 5 or less. A first coloring material includes a maximum absorption wavelength of 470 to 530 nm and an absorption spectrum half width of 15 to 45 nm. A second coloring material includes a maximum absorption wavelength of 560 to 620 nm and an absorption spectrum half width of 15 to 55 nm. A third coloring material has a wavelength having the lowest transmittance in a wavelength range of 400 to 800 nm is in a range of 650 to 800 nm.

17 Claims, 3 Drawing Sheets

(51) Int. Cl.
*G02B 1/115* (2015.01)
*G02B 1/14* (2015.01)
*G02B 5/28* (2006.01)

(52) U.S. Cl.
CPC ........ *G02B 5/28* (2013.01); *B32B 2307/4026* (2013.01); *B32B 2551/00* (2013.01)

(58) Field of Classification Search
USPC ............... 359/577, 580, 589, 590, 359, 614; 252/582, 586
See application file for complete search history.

(56) References Cited

U.S. PATENT DOCUMENTS

| | | | | |
|---|---|---|---|---|
| 2005/0046321 | A1* | 3/2005 | Suga | G02B 6/0051 313/112 |
| 2006/0286381 | A1* | 12/2006 | Naito | G02B 1/11 428/411.1 |
| 2010/0103355 | A1* | 4/2010 | Sakamoto | G02F 1/133509 428/1.31 |
| 2017/0343710 | A1 | 11/2017 | Shiono et al. | |
| 2021/0317304 | A1* | 10/2021 | Hatta | B32B 27/288 |
| 2022/0107450 | A1* | 4/2022 | Inabe | C09B 47/08 |
| 2023/0358930 | A1* | 11/2023 | Ishimaru | G02B 5/208 |
| 2023/0358931 | A1* | 11/2023 | Ishimaru | C09J 11/06 |
| 2023/0358932 | A1* | 11/2023 | Ishimaru | G02B 5/28 |

FOREIGN PATENT DOCUMENTS

| | | | | |
|---|---|---|---|---|
| JP | 2001-147319 | A | | 5/2001 |
| JP | 2003-140145 | A | | 5/2003 |
| JP | 2003-315544 | A | | 11/2003 |
| JP | 2007-226239 | A | | 9/2007 |
| JP | 2008-083597 | A | | 4/2008 |
| JP | 2008-102340 | A | | 5/2008 |
| JP | 2009-031733 | A | | 2/2009 |
| JP | 2010061066 | A | * | 3/2010 |
| JP | 2011141356 | A | * | 7/2011 |
| JP | 2016-126064 | A | | 7/2016 |
| JP | 6142398 | B | | 6/2017 |
| JP | 2018136361 | A | * | 8/2018 |
| JP | 2019-056865 | A | | 4/2019 |
| KR | 1020170096955 | A | | 8/2017 |
| KR | 10-2019-0109988 | A | | 9/2019 |
| TW | 200906942 | A | | 2/2009 |
| TW | 201905504 | A | | 2/2019 |
| WO | WO-2005/022212 | A1 | | 3/2005 |
| WO | WO-2019/004044 | A1 | | 1/2019 |

OTHER PUBLICATIONS

Office Action issued in corresponding Japanese Patent Application No. 2022-576953 dated Oct. 24, 2023 (12 pages).

International Search Report and Written Opinion issued in connection with PCT Appl. Ser. No. PCT/JP2021/026616 dated Sep. 7, 2021.

Office Action issued in corresponding Taiwanese Patent Application No. 111101945 dated Dec. 12, 2025.

Office Action issued in corresponding Korean Patent Application No. 10-2023-7020801 dated Jan. 20, 2026.

Office Action issued in corresponding Chinese Patent Application No. 202180091036.3 dated May 15, 2026.

* cited by examiner

OPTICAL FILM, DISPLAY DEVICE, AND COMPOSITION FOR FORMING COLORED LAYER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/026616, filed on Jul. 15, 2021, which in turn claims the benefit of JP 2021-006752, filed Jan. 19, 2021, the disclosures of which are all incorporated herein by reference in its entirety.

TECHNICAL FIELD

The present invention relates to an optical film, a display device, and a composition for forming a colored layer.

BACKGROUND

One known technique for improving the color purity of a display device includes separating or correcting white light and monochromatic light emitted from a light source of a display device using a color filter, thereby narrowing a full width at half maximum.

To improve the color purity using the color filter, the concentration of coloring material needs to be increased, or the thickness of the filter needs to be increased. Increasing the concentration of the coloring material may deteriorate the photolithographic properties. Increasing the thickness of the filter may deteriorate a pixel shape or viewing angle properties.

Furthermore, a color filter with improved color purity is generally low in transmittance and likely to lower luminance efficiency.

In view of the above circumstances, a method for improving the color purity without using a color filter has been proposed.

PTL 1 discloses a display filter configured by a filter base, which includes an antireflection layer and an electromagnetic shielding layer, and a color correction layer provided on the filter base. Since the display filter is configured by providing the color correction layer on the antireflection film, there is no need for a photolithographic process during manufacturing, and the luminance efficiency is unlikely to decrease.

PTL 2 discloses coloring materials suitable for the color correction layer.

CITATION LIST

Patent Literature

PTL 1: JP 2007-226239 A
PTL 2: JP 6142398 B

SUMMARY OF THE INVENTION

Technical Problem

Many of functional colorants contained in the coloring material used for the color correction layer have low lightfastness, low heat resistance, and low moisture and heat resistance. For this reason, a display filter that uses such functional colorants may become unable to sufficiently exert a color correction function due to deterioration of the function of the functional colorants with use.

The inventors have studied the solution to this problem and have accomplished the present invention.

An object of the present invention is to provide an optical film that has a good color correction function and withstands long-term use.

Solution to Problem

To solve the above problems, a first aspect of the present invention provides an optical film including a sheet-like substrate having opposite first and second surfaces, an optical function layer, and a colored layer. The sheet-like substrate has an ultraviolet shielding rate of 85% or higher according to JIS L 1925. The optical function layer is formed to face the first surface of the substrate. The colored layer is formed to face the second surface of the substrate and includes a colorant. A difference ΔE*ab between chromaticities before and after a lightfastness test in which the optical film is irradiated with a xenon lamp with an illuminance of 60 W/cm$^2$ at a wavelength of 300 to 400 nm for 120 hours under conditions including a temperature of 45° C. and a humidity of 50% RH satisfies the following Expression (1):

$$\Delta E^*ab \leq 5 \quad (1).$$

The colorant included in the colored layer includes at least one of a first coloring material, a second coloring material, and a third coloring material. The first coloring material includes a maximum absorption wavelength in a range of 470 to 530 nm and an absorption spectrum half width of 15 to 45 nm. The second coloring material includes a maximum absorption wavelength in a range of 560 to 620 nm and an absorption spectrum half width of 15 to 55 nm. In the third coloring material, a wavelength having the lowest transmittance in a wavelength range of 400 to 800 nm is in a range of 650 to 800 nm. The colorant includes absorption wavelength bands one of which has a transmittance of 1% or higher and less than 50%.

A display device according to a second aspect of the present invention includes a light source and the optical film according to the first aspect disposed in such a manner that the second surface faces the light source.

A composition for forming a colored layer according to a third aspect of the present invention includes an active energy ray-curable resin, a photoinitiator, a colorant, an additive, and a solvent.

The colorant includes at least one of a first coloring material, a second coloring material, and a third coloring material. The first coloring material includes a maximum absorption wavelength in a range of 470 to 530 nm and an absorption spectrum half width of 15 to 45 nm. The second coloring material includes a maximum absorption wavelength in a range of 560 to 620 nm and an absorption spectrum half width of 15 to 55 nm. In the third coloring material, a wavelength having the lowest transmittance in a wavelength range of 400 to 800 nm is in a range of 650 to 800 nm. The colorant includes absorption wavelength bands one of which has a transmittance of 1% or higher and less than 50%. The additive includes one or more of a radical scavenger, peroxide decomposer, and singlet oxygen quencher.

Advantageous Effect of the Invention

The above-mentioned aspects of the present invention provide an optical film that has a good color correction function and withstands long-term use, a display device including the optical film, and a composition for forming a colored layer used for manufacturing the optical film.

DETAILED DESCRIPTION

FIGS. 1 to 4 are schematic cross-sectional views of optical films 1 and 1A to 1C according to first to fourth embodiments of the present invention. The upper side in FIGS. 1 to 4 corresponds to an observer side when a displayed image on a display device is observed. The first embodiment of the present invention will be described below with reference to FIG. 1.

<First Embodiment>

Figure 1:
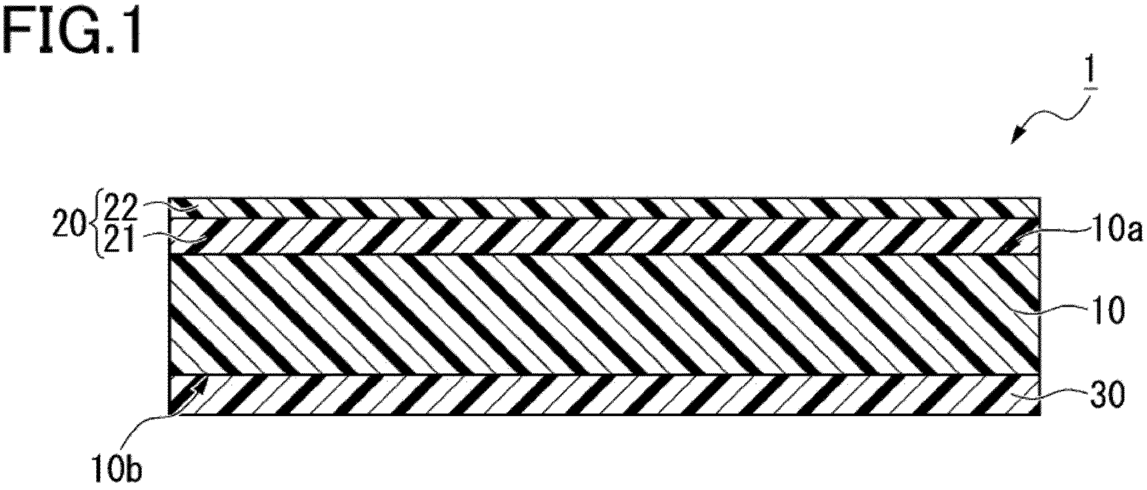
FIG. 1 is a schematic cross-sectional view of an optical film 1 according to a first embodiment of the present invention.

FIG. 1 is a schematic cross-sectional view of the optical film 1 according to the present embodiment. The optical film 1 includes a sheet-like transparent substrate 10, an optical function layer 20, which is formed on a first surface 10*a* of the transparent substrate 10, and a colored layer 30, which is formed on a second surface 10*b* of the transparent substrate 10. Note that, the transparent substrate 10 may also be simply referred to as the substrate 10.

In the present embodiment, the direction in which the colored layer 30, the substrate 10, and the optical function layer 20 are laminated will be referred to as a thickness direction. One side in the thickness direction (the observer side when a displayed image on the display device is observed) will be referred to as the upper side and the opposite side will be referred to as the lower side.

The substrate 10 has an ultraviolet shielding rate of 85% or higher and functions as an ultraviolet shielding layer (ultraviolet absorbing layer) for protecting the colorant contained in the colored layer 30 from ultraviolet light. The ultraviolet shielding rate is a value measured in accordance with JIS L 1925 and is calculated using the following expression.

Figure 5:
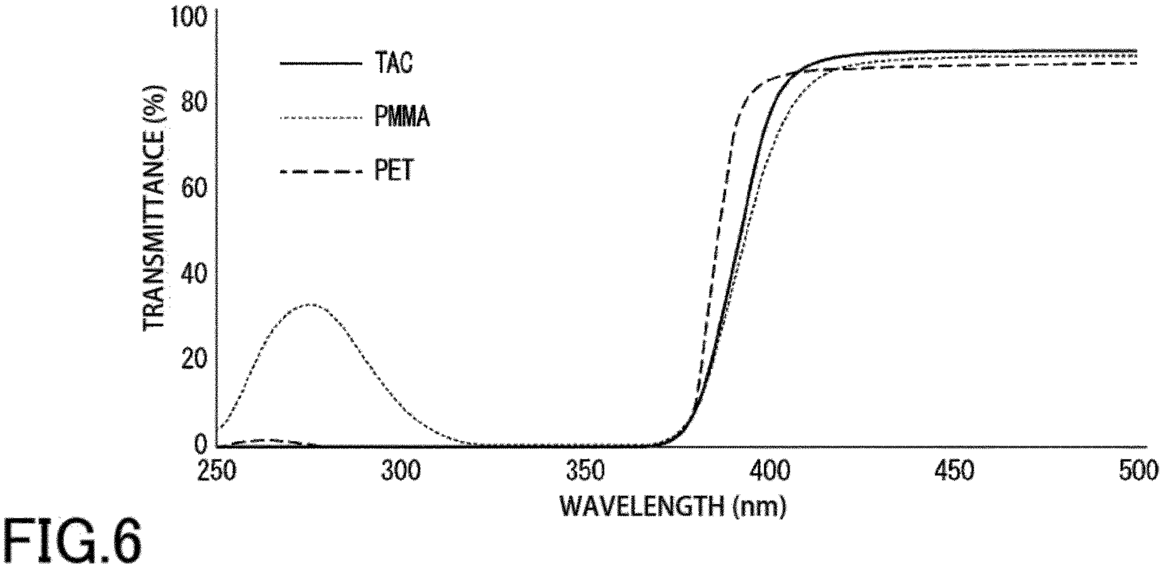
FIG. 5 is a graph illustrating light transmission profiles of transparent substrates.

Ultraviolet shielding rate (%)=100−average transmittance (%) of ultraviolet light with a wavelength of 290 to 400 nm Examples of materials for the substrate 10 include polyolefins such as polyethylene and polypropylene, polyesters such as polybutylene terephthalate and polyethylene naphthalate, polyamides such as nylon-6 and nylon-66, polyacrylates such as polymethylmethacrylate (PMMA), transparent resins such as triacetylcellulose (TAC), polyethylene terephthalate (PET), polyimides, polyarylates, polycarbonates, polyacrylates, polyvinyl alcohols, polyvinyl chloride, cyclo olefin copolymers, norbornene-containing resins, polyether sulfones, and polysulfones, and inorganic glasses. Among these materials, a film formed of polyethylene terephthalate (PET), a film formed of triacetylcellulose (TAC), and a film formed of polymethylmethacrylate (PMMA) are suitably used. The thickness of the substrate 10 is preferably, but not limited to, 10 to 100 μm. FIG. 5 illustrates light transmission profiles of transparent substrates formed of these materials. In FIG. 5, the ultraviolet shielding rate of each substrate is as follows, and any of these materials may be suitably used as the substrate 10.

TAC: 91.7%

PMMA: 90.2%

PET: 88.1%

The ultraviolet absorptivity of the substrate 10 may be imparted by, for example, the resin material itself for forming the substrate 10 or by adding an ultraviolet absorber. The ultraviolet absorber may be, but not limited to, a benzophenone-, benzotriazole-, triazine-, oxanilide-, or cyanoacrylate-based compound.

The optical function layer 20 illustrated in FIG. 1 includes a hardcoat layer 21, which is in contact with the first surface 10*a*, and a low refractive index layer 22 formed on the hardcoat layer 21.

The hardcoat layer 21 is a hard resin layer and enhances the scratch resistance of the optical film 1. Additionally, the hardcoat layer 21 may have a refractive index higher than that of the low refractive index layer 22. The resin for forming the hardcoat layer 21 is a resin that is curable by polymerization in response to being irradiated with an active energy ray such as ultraviolet light and an electron beam and may be, for example, a monofunctional, two-functional, or three-or-more functional (meth)acrylate monomer. Note that, in the present description, "(meth)acrylate" is a collective term for acrylate and methacrylate, and "(meth)acryloyl" is a collective term for acryloyl and methacryloyl.

Examples of the monofunctional (meth)acrylate compound include 2-hydroxyethyl (meth)acrylate, 2-hydroxypropyl (meth)acrylate, 2-hydroxybutyl (meth)acrylate, n-butyl (meth)acrylate, isobutyl (meth)acrylate, t-butyl (meth)acrylate, glycidyl (meth)acrylate, acryloylmorpholine, N-vinylpyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth) acrylate, tridecyl (meth)acrylate, cetyl (meth)acrylate, stearyl (meth)acrylate, benzyl (meth)acrylate, 2-ethoxyethyl (meth)acrylate, 3-methoxybutyl (meth)acrylate, ethyl carbitol (meth)acrylate, phosphate (meth)acrylate, ethylene-oxide-modified phosphate (meth)acrylate, phenoxy (meth) acrylate, ethylene-oxide-modified phenoxy (meth)acrylate, propylene-oxide-modified phenoxy (meth)acrylate, nonyl phenol (meth)acrylate, ethylene-oxide-modified nonyl phenol (meth)acrylate, propylene-oxide-modified nonyl phenol (meth)acrylate, methoxy diethylene glycol (meth)acrylate, methoxy polytheylene glycol (meth)acrylate, methoxy propylene glycol (meth)acrylate, 2-(meth)acryloyl oxyethyl-2-hydroxy propyl phthalate, 2-hydroxy-3-phenoxy propyl (meth)acrylate, 2-(meth)acryloyl oxyethyl hydrogen phthalate, 2-(meth)acryloyl oxypropyl hydrogen phthalate, 2-(meth)acryloyl oxypropyl hexahydro hydrogen phthalate, 2-(meth)acryloyl oxypropyl tetrahydro hydrogen phthalate, dimethylaminoethyl (meth)acrylate, trifluoroethyl (meth) acrylate, tetrafluoropropyl (meth)acrylate, hexafluoropropyl (meth)acrylate, octafluoropropyl (meth)acrylate, and adamantine derivatives of mono(meth)acrylates, such as adamantyl acrylate having monovalent mono(meth)acrylate derived from 2-adamantane and an adamantine diol.

Examples of the difunctional (meth)acrylate compound include di(meth)acrylates such as ethylene glycol di(meth) acrylate, diethylene glycol di(meth)acrylate, butanediol di(meth)acrylate, hexanediol di(meth)acrylate, nonanediol di(meth)acrylate, ethoxylated hexanediol di(meth)acrylate, propoxylated hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate, and hydroxy pivalic acid neopentyl glycol di(meth)acrylate.

Examples of the trifunctional or higher (meth)acrylate compound include tri(meth)acrylates such as trimethylolpropane tri(meth)acrylate, ethoxylated trimethylolpropane tri(meth)acrylate, propoxylated trimethylolpropane tri (meth)acrylate, tris-2-hydroxyethyl isocyanurate tri(meth) acrylate, and glycerol tri(meth)acrylate, trifunctional (meth) acrylate compounds such as pentaerythritol tri(meth) acrylate, dipentaerythritol tri(meth)acrylate, and ditrimethylolpropane tri(meth)acrylate, trifunctional or higher polyfunctional (meth)acrylate compounds such as pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate, and ditrimethylolpropane hexa(meth)acrylate, and polyfunctional (meth)acrylate compounds in which a part of each of these (meth)acrylates is substituted with an alkyl group or ε-caprolactone.

The active energy ray-curable resin may be a urethane (meth)acrylate. Examples of urethane (meth)acrylate include compounds obtained by reacting a product, which is obtained by reacting a polyester polyol with an isocyanate monomer or a prepolymer, with a (meth)acrylate monomer containing a hydroxyl group.

Examples of the urethane (meth)acrylate include a pentaerythritol triacrylate hexamethylene diisocyanate urethane prepolymer, a dipentaerythritol pentaacrylate hexamethylene diisocyanate urethane prepolymer, a pentaerythritol triacrylate toluene diisocyanate urethane prepolymer, a dipentaerythritol pentaacrylate toluene diisocyanate urethane prepolymer, a pentaerythritol triacrylate isophorone diisocyanate urethane prepolymer, and a dipentaerythritol pentaacrylate isophorone diisocyanate urethane prepolymer.

The resin described above may be used singly or in combination of two or more kinds. The above-described resin may be a monomer or an oligomer that is partially polymerized in the composition for forming the hardcoat layer. The hardness of the hardcoat layer 21 is preferably a pencil hardness of H or higher on the surface at a load of 500 g.

The hardcoat layer 21 may contain an ultraviolet absorber for inhibiting deterioration of the colorant contained in the colored layer 30. Like the substrate 10, the ultraviolet shielding rate of the hardcoat layer 21 is preferably 85% or higher. The absorption wavelength region of the ultraviolet absorber contained in the hardcoat layer 21 in the ultraviolet region is preferably in the range of 290 to 370 nm. Examples of such an ultraviolet absorber include benzophenone-, benzotriazole-, triazine-, oxanilide-, and cyanoacrylate-based compounds. The ultraviolet absorber is added to inhibit deterioration of the colorant contained in the colored layer 30. Thus, the ultraviolet absorber is used that absorbs, in the ultraviolet region, light in the wavelength region that contributes to the deterioration of the colorant contained in the colored layer 30.

It is noted, however, in curing the composition containing the ultraviolet absorber, an excessively large amount of absorption of ultraviolet light by the ultraviolet absorber causes the composition to be insufficiently cured, which undesirably results in a lack of surface hardness of the obtained optical film.

Given the circumstances, in the present embodiment, the ultraviolet shielding layer (ultraviolet absorbing layer), which is a cured film of a composition containing an energy ray-curable compound, a photoinitiator, and an ultraviolet absorber, includes an ultraviolet absorber whose absorption wavelength region in the ultraviolet region differs from the absorption wavelength region of the photoinitiator in the ultraviolet region. This inhibits the ultraviolet absorber from hindering the curing of the film to be cured. Furthermore, since the film to be cured is cured to a predetermined cure degree, the cured layer having a desired cure degree is reliably obtained.

An acylphosphine oxide-based photoinitiator is suitably used as the photoinitiator whose absorption wavelength region differs from the absorption wavelength region (the wavelength region that contributes to the deterioration of the colorant contained in the colored layer 30) of the ultraviolet absorber to be contained in any layer constituting the ultraviolet shielding layer. Examples of the acylphosphine oxide-based photoinitiator include diphenyl (2,4,6-trimethylbenzoyl)phosphine oxide and phenylbis(2,4,6-trimethylbenzoyl)phosphine oxide.

Since the absorption wavelength region differs between the ultraviolet absorber and the photoinitiator, curing of the ultraviolet shielding layer containing the ultraviolet absorber is inhibited from being hindered in forming the ultraviolet shielding layer. Additionally, after the ultraviolet shielding layer is cured, the colorant included in the colored layer 30 is inhibited from deteriorating due to the ultraviolet light.

Other examples of the photoinitiator used for the composition for forming the hardcoat layer include 2,2-ethoxyacetophenone, 1-hydroxycyclohexyl phenyl ketone, dibenzoyl, benzoin, benzoin methyl ether, benzoin ethyl ether, p-chlorobenzophenone, p-methoxybenzophenone, Michler's ketone, acetophenone, and 2-chlorothioxanthone. These photoinitiators may be used singly or in combination of two or more kinds.

The solvents used for the composition for forming the hardcoat layer include ethers, such as dibutyl ether, dimethoxymethane, dimethoxyethane, diethoxyethane, propylene oxide, 1,4-dioxane, 1,3-dioxolane, 1,3,5-trioxane, tetrahydrofuran, anisole and phenetole, or ketones, such as acetone, methyl ethyl ketone, diethyl ketone, dipropyl ketone, diisobutyl ketone, methyl isobutyl ketone, cyclopentanone, cyclohexanone, and methylcyclohexanone, or esters, such as ethyl formate, propyl formate, n-pentyl formate, methyl acetate, ethyl acetate, methyl propionate, ethyl propionate, n-pentyl acetate, and γ-butyrolactone, or further, cellosolves, such as methyl cellosolve, cellosolve, butyl cellosolve, and cellosolve acetate. These solvents may be used singly or in combination of two or more kinds.

The composition for forming the hardcoat layer may contain metal oxide particulates for the purpose of adjusting the refractive index or imparting hardness. Examples of the metal oxide particulates include zirconium oxide, titanium oxide, niobium oxide, antimony trioxide, antimony pentoxide, tin oxide, indium oxide, indium tin oxide, and zinc oxide.

The composition for forming the hardcoat layer may contain any of silicon oxide, a fluorine-containing silane compound, a fluoroalkylsilazane, a fluoroalkylsilane, a fluorine-containing silicon-based compound, and a perfluoro polyether group-containing silane coupling agent that imparts water repellency and/or oil repellency and thus improves antifouling properties.

As other additives, for example, a leveling agent, antifoaming agent, antioxidant, photostabilizer, photosensitizer, or conductive material may be added to the composition for forming the hardcoat layer.

When the optical film 1 is applied to the display device, the low refractive index layer 22 is located on the side closest to a user (viewer) who views the display. The low refractive index layer 22 prevents strong reflection of external light and improves visibility of the display device.

The low refractive index layer 22 may be a layer including an inorganic material or an inorganic compound. Examples of the inorganic material and the inorganic compound include particulates of, for example, LiF, MgF, 3NaF·AIF, AIF, and Na3AIF6 and silica particulates. Silica particulates having gaps inside particles, such as porous silica particulates and hollow silica particulates, effectively lower the refractive index of the low refractive index layer. The photoinitiator, solvent, and other additives described for the hardcoat layer 21 may be added to the composition for forming the low refractive index layer as required.

The refractive index of the low refractive index layer 22 only needs to be lower than the refractive index of the hardcoat layer 21 and is preferably 1.55 or lower. The film thickness of the low refractive index layer 22 is preferably, but not limited to, in a range from 40 nm to 1 μm.

The low refractive index layer 22 may contain any of silicon oxide, a fluorine-containing silane compound, a fluoroalkylsilazane, a fluoroalkylsilane, a fluorine-containing silicon-based compound, and a perfluoro polyether group-containing silane coupling agent. These materials impart water repellency and/or oil repellency to the low refractive index layer 22 and thus improve antifouling properties.

The colored layer 30 contains a colorant for selectively absorbing a wavelength band of visible light. The colored layer 30 may be configured by a base resin formed of an active energy ray-curable resin including a colorant.

The colorant includes at least one of a group consisting of three kinds of coloring materials including first to third coloring materials. The kind of coloring material contained does not necessarily have to be one kind, and two or more kinds of coloring materials may be contained.

The first coloring material has a maximum absorption wavelength in the range of 470 nm to 530 nm and an absorption spectrum half width (full width at half maximum) of 15 nm to 45 nm.

The second coloring material has a maximum absorption wavelength in the range of 560 nm to 620 nm and an absorption spectrum half width (full width at half maximum) of 15 nm to 55 nm.

In the third coloring material, a wavelength having the lowest transmittance in a wavelength range of 400 to 800 nm is in a range of 650 to 800 nm.

Note that, in the following description, the absorption spectrum half width refers to the full width at half maximum.

In the colored layer 30, the transmittance at the maximum absorption wavelength of one of the absorption wavelength bands of the coloring materials is 1% or higher and less than 50%.

Figure 6:
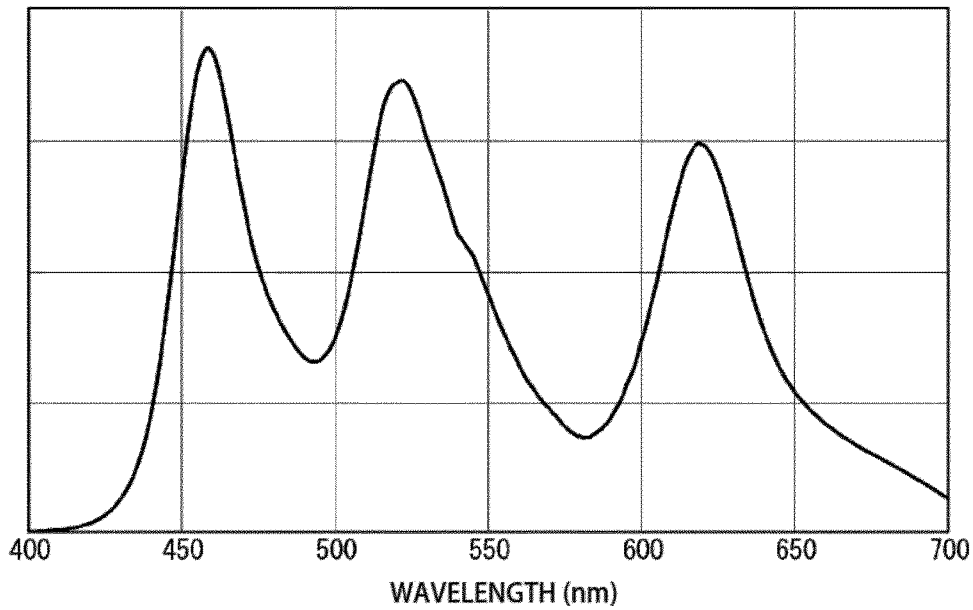
FIG. 6 shows a spectrum of a light source used for evaluation of transmission properties.

The use of the coloring materials having the above-described absorption properties as the first to third coloring materials to be contained in the colored layer 30 allows the colored layer 30 to absorb, among the visible light rays emitted by the display device, the visible light ray in a wavelength region in which the emission intensity is relatively low. For example, the first, second, and third coloring materials allow the colored layer 30 to absorb, among the visible light rays in the wavelength range of 400 to 800 nm, the visible light in the range of 470 nm to 530 nm, 560 nm to 620 nm, and 650 to 800 nm, respectively. The wavelengths absorbed by the first, second, and third coloring materials overlap with the wavelength range in which the emission intensity is relatively low among the visible light rays emitted by the OLED display device according to a spectrum of the display device during white display as shown in FIG. 6. Note that, the display device is not limited to the OLED display device, and other display devices are possible.

The first to third coloring materials may be coloring materials including one or more compounds selected from a group consisting of compounds having any of a porphyrin structure, merocyanine structure, phthalocyanine structure, azo structure, cyanine structure, squarylium structure, coumarin structure, polyene structure, quinone structure, tetraazaporphyrin structure, pyrromethene structure, and indigo structure and their metal complexes. In particular, a metal complex having, in each molecule, a porphyrin structure, a pyrromethene structure, or a phthalocyanine structure or a squarylium structure is preferably used. For example, a pyrromethene cobalt complex may be used as the first coloring material. Tetraazaporphyrin copper complex may be used as the second coloring material.

The colored layer 30 may contain at least one of a radical scavenger, singlet oxygen quencher, and peroxide decomposer.

The coloring materials included in the colored layer 30 are deteriorated by light rays and heat promoted under the influence of oxygen. Adding the radical scavenger in the colored layer 30 prevents deterioration of the colorants caused by autoxidation, by scavenging radicals in the event of oxidation degradation of the coloring material. This further increases the duration of the color correction function.

Additionally, adding the singlet oxygen quencher to the colored layer 30 inactivates the highly reactive singlet oxygen having properties that tend to oxidize and degrade (fade) the colorant, and inhibits the colorant from being oxidized and degraded (faded). In the case in which the peroxide decomposer is mixed in the colored layer 30, the peroxide decomposer decomposes peroxide generated when the colorant is oxidized and degraded. This stops an autoxidation cycle and inhibits degradation (fading) of the colorant.

The radical scavenger and the singlet oxygen quencher may be used in combination. Additionally, the peroxide decomposer may be combined.

As the radical scavenger, a hindered amine-based photostabilizer may be used. The hindered amine-based photostabilizer having a molecular weight of 2000 or more is highly effective in inhibiting color fading, which is particularly preferred. When the radical scavenger has a low molecular weight, a small number of molecules remain in the colored layer 30 because the radical scavenger is volatile, which may hinder achieving a sufficient effect in inhibiting the color fading. Examples of the material suitably used for the radical scavenger include Chimassorb 2020FDL, Chimassorb 944FDL, and Tinuvin 622 manufactured by BASF, and LA-63P manufactured by ADEKA CORPORATION.

Examples of the singlet oxygen quencher include a transition metallic complex, colorants, amines, phenols, and sulfides. Examples of the material particularly suitably used include a transition metallic complex of dialkyl phosphate, dialkyl dithiocarbamate, benzenedithiol, or similar dithiols. Nickel, copper, or cobalt is suitably used as the central metal of these transition metallic complexes.

The peroxide decomposer decomposes peroxide generated when the colorant is oxidized and degraded, stops the autoxidation cycle, and functions to inhibit the degradation (fading) of the colorant. The peroxide decomposer may be a phosphorus-based antioxidant or a sulfur-based antioxidant.

Examples of the phosphorus-based antioxidant include 2,2'-methylenebis(4,6-di-t-butyl-1-phenyloxy)(2-ethylhexyloxy)phosphorus, 3,9-bis(2,6-di-tert-butyl-4-methylphenoxy)-2,4,8,10-tetraoxa-3,9-diphosphaspiro[5.5]undecane, and 6-[3-(3-t-butyl-4-hydroxy-5-methylphenyl)propoxy]-2,4,8,10-tetra-t-butyldibenz[d,F][1,3,2]dioxaphosphepine.

Examples of the sulfur-based antioxidant include 2,2-bis({[3-(dodecylthio)propionyl]oxy}methyl)-1,3-propanediyl-bis[3-(dodecylthio)propionate], 2-mercaptobenzimidazole, dilauryl-3,3'-thiodipropionate, dimyristyl-3,3'-thiodipropionate, distearyl-3,3'-thiodipropionate, pentaerythrityl-tetrakis(3-laurylthiopropionate), and 2-mercaptobenzothiazole.

The optical film 1 is manufactured by forming the optical function layer 20 on the first surface 10*a* of the substrate 10 and the colored layer 30 on the second surface 10*b*.

The hardcoat layer 21, the low refractive index layer 22, and the colored layer 30 are formed by, for example, applying and drying a coating liquid including the material for forming each layer. The low refractive index layer 22 may also be formed by, for example, vapor deposition or sputtering.

Either the optical function layer 20 or the colored layer 30 may be formed first.

The hardcoat layer 21 is easily formed with the energy ray-curable compound such as an ultraviolet curable resin. In this case, a coating liquid containing the energy ray-curable compound, polymerization initiator, and ultraviolet absorber is applied, followed by irradiating with corresponding energy rays to form the hardcoat layer 21. When the ultraviolet curable resin is used, as described above, the absorption wavelength region of the photoinitiator in the ultraviolet region preferably differs from the absorption wavelength region of the ultraviolet absorber in the ultraviolet region.

The optical film 1 may be located inside a display device, such as a display, as a color correction filter. In doing so, the colored layer 30 is located to face the light source.

When the light emitted from the light source is transmitted through the colored layer 30, the wavelength components at and around the maximum absorption wavelength of the contained coloring materials are absorbed. This improves the color purity of the display device. Furthermore, unlike the color filter, the concentration of the coloring materials does not need to be so high, and thus the color purity is improved without excessively decreasing the luminance of the display device.

Although the coloring materials included in the colored layer 30 have an excellent color correction function, the resistance to light rays, in particular, ultraviolet light may be insufficient. Thus, when irradiated with ultraviolet light, the colorants degrade with time and become unable to absorb light at and around the maximum absorption wavelength.

In the case in which the optical film 1 of the present embodiment is mounted on the display device with the first surface 10*a* of the substrate 10 facing the observer side and the second surface 10*b* of the substrate 10 facing the light source, external light including ultraviolet light incident on the display screen is transmitted through the substrate 10 and enters the colored layer 30. Since the substrate 10 has a high ultraviolet shielding rate, most of the ultraviolet light included in the external light is not transmitted through the substrate 10 nor reach the colored layer 30. Thus, with the optical film 1, the chromaticity difference ΔE*ab between before and after conducting a lightfastness test (irradiated with a xenon lamp with an illuminance of 60 W/$cm^2$ (300 to 400 nm) under conditions of a temperature of 45° C. and a humidity of 50% RH for 120 hours) satisfies the following Expression (1):

$$\Delta E^*ab \leq 5 \quad (1).$$

That is, the degradation of the coloring materials included in the colored layer 30 is prevented, and the color correction function is maintained for a long time. Note that, ΔE*ab in Expression (1) is the chromaticity difference standardized by the Commission International de l'Eclairage (CIE).

<Second Embodiment>

A second embodiment of the present invention will be described with reference to FIG. 2. In the following description, components that are common to those described above are denoted by the same reference signs, and duplicated description thereof will be omitted.

Figure 2:
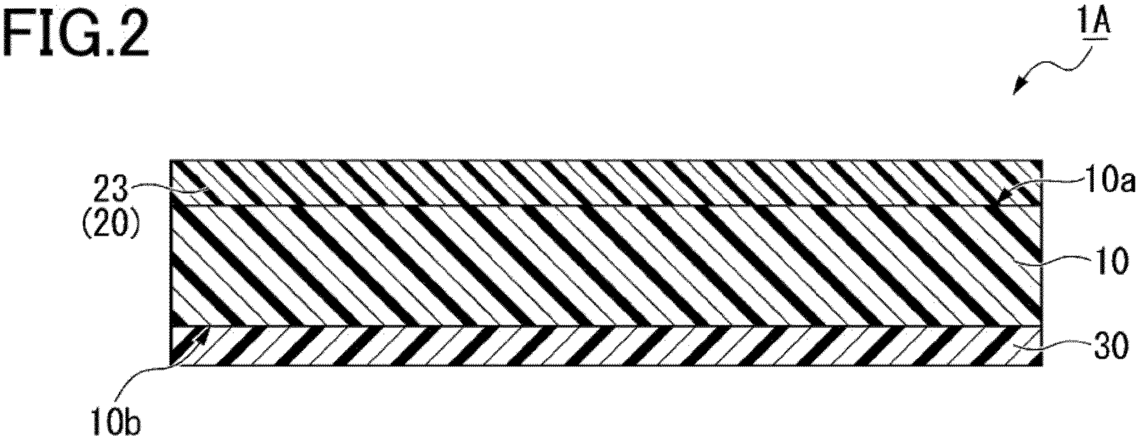
FIG. 2 is a schematic cross-sectional view of an optical film 1A according to a second embodiment of the present invention.

FIG. 2 is a schematic cross-sectional view of an optical film 1A according to the present embodiment illustrating the layer structure. The optical film 1A includes the transparent substrate 10, the optical function layer 20, which is formed on the first surface 10*a* of the substrate 10, and the colored layer 30, which is formed on the second surface 10*b* of the substrate 10. The optical film 1A includes an antiglare layer (AG layer) 23 as the optical function layer 20.

The antiglare layer 23 has fine asperities on the surface and reduces reflection of external light by scattering the external light by the asperities. The antiglare layer 23 is formed by applying and curing an active energy ray-curable resin and a composition for forming an antiglare layer containing organic particulates and/or inorganic particulates as required. The active energy ray-curable resin used for the composition for forming the antiglare layer may be the resin described for the hardcoat layer 21. This improves the scratch resistance of the optical film 1A. The thickness of the antiglare layer 23 is preferably, but not limited to, 1 to 10 μm.

The organic particulates used for the composition for forming the antiglare layer may be a material that mainly forms fine asperities on the surface of the antiglare layer 23 and imparts a function that scatters external light. The organic particulates may be resin particles formed of resin material transparent to light, such as an acrylic resin, polystyrene resin, styrene-(meth)acrylate ester copolymer, polyethylene resin, epoxy resin, silicone resin, polyvinylidene fluoride, and polyfluoroethylene-based resin. To adjust the refractive index and the dispersibility of the resin particles, two or more kinds of resin particles having different material properties (refractive index) may be mixed for use.

The inorganic particulates used for the composition for forming the antiglare layer may be a material for mainly adjusting the settling and aggregation of the organic particulates in the antiglare layer 23. The inorganic particulates may be, for example, silica particulates, metal oxide particulates, and different kinds of mineral particulates.

Examples of the silica particulates include surface-modified silica particulates whose surface is modified by a reactive functional group such as colloidal silica and a (meth) acryloyl group. Examples of the metal oxide particulates include alumina, zinc oxide, tin oxide, antimony oxide, indium oxide, titania, and zirconia. Examples of the mineral particulates include mica, synthetic mica, vermiculite, montmorillonite, iron-montmorillonite, bentonite, bidelite, saponite, hectorite, stevensite, nontronite, magadiite, ilerite, kanemite, layered titanic acid, smectite, and synthetic smectite. The mineral particulates may be either natural or synthetic substances (including substitutes or derivatives), and a mixture of these may also be used. Among the mineral particulates, layered organic clay is more preferred. The layered organic clay refers to swellable clay having organic onium ions introduced into its interlayer spaces. The organic onium ion may be any one that can convert the swellable clay into an organic form by utilizing the cation exchangeability of the swellable clay. In the case in which the layered organic clay mineral is used as the mineral particulates, the above-described synthetic smectite is suitably used. Synthetic smectite has functions that increase the viscosity of the coating liquid for forming the antiglare layer, inhibit the settling of resin particles and inorganic particulates, and adjust the shape of the asperities on the surface of the optical function layer.

The composition for forming the antiglare layer may contain any of silicon oxide, a fluorine-containing silane compound, fluoroalkylsilazane, fluoroalkylsilane, a fluorine-containing silicon-based compound, and a perfluoro polyether group-containing silane coupling agent. These materials impart water repellency and/or oil repellency to the antiglare layer 23 and thus improve antifouling properties.

The antiglare layer 23 may include a layer having a relatively high refractive index and a layer having a relatively low refractive index laminated in this order from the side closer to the colored layer 30 (lower side) by unevenly distributing the material. The antiglare layer 23 including unevenly distributed material is formed by, for example, applying a composition containing a low refractive index material including surface-modified silica particulates or hollow silica particulates and a high refractive index material and causing phase separation using the difference between the surface free energies of the low refractive index material and the high refractive index material. In the case in which the antiglare layer 23 is formed of two layers that underwent phase separation, the layer that is located closer to the colored layer 30 and has a relatively high refractive index preferably has a refractive index of 1.50 to 2.40, and the layer located on the front surface side of the optical film 1A and has a relatively low refractive index preferably has a refractive index of 1.20 to 1.55.

The optical film 1A is manufactured by sequentially forming the antiglare layer 23 on the first surface 10*a* of the substrate 10 and the colored layer 30 on the second surface 10*b* of the substrate 10. The antiglare layer 23 is formed by, for example, applying and drying a coating liquid including material for forming each layer.

The optical film 1A according to the present embodiment reduces reflection of external light while preventing degradation of the coloring material included in the colored layer 30 like in the first embodiment described above.

<Third Embodiment>

A third embodiment of the present invention will be described with reference to FIG. 3. In the following description, components that are common to those described above are denoted by the same reference signs, and duplicated description thereof will be omitted.

Figure 3:
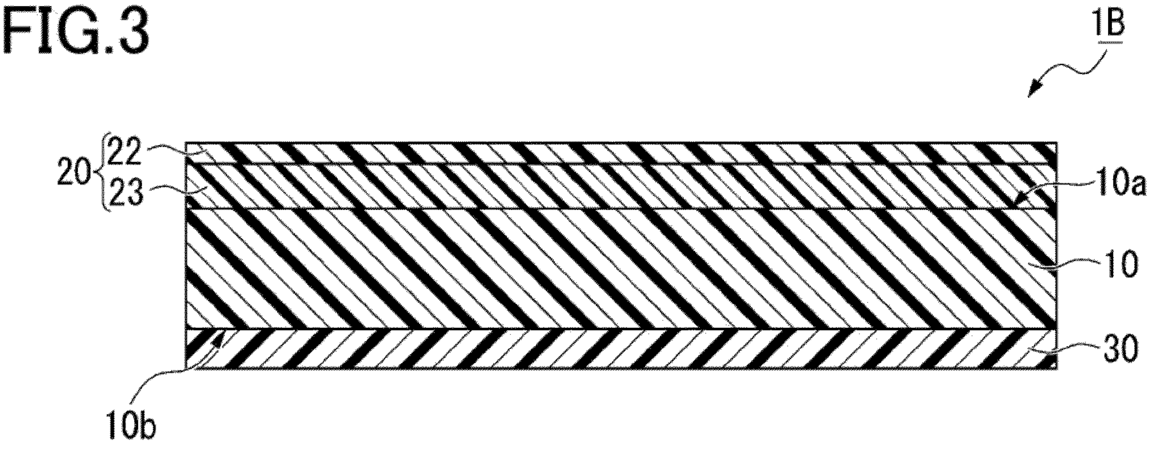
FIG. 3 is a schematic cross-sectional view of an optical film 1B according to a third embodiment of the present invention.

FIG. 3 is a schematic cross-sectional view of an optical film 1B according to the present embodiment illustrating the layer structure. The optical film 1B includes the transparent substrate 10, the optical function layer 20, which is formed on the first surface 10*a* of the substrate 10, and the colored layer 30, which is formed on the second surface 10*b* of the substrate 10. The optical film 1B includes, as the optical function layer 20, the antiglare layer 23 and the low refractive index layer 22, which is formed on the antiglare layer 23. The antiglare layer 23 may have a refractive index higher than that of the low refractive index layer 22.

The optical film 1B is manufactured by sequentially forming the antiglare layer 23 on the first surface 10*a* of the substrate 10 and the low refractive index layer 22 on the antiglare layer 23, and forming the colored layer 30 on the second surface 10*b* of the substrate 10.

The optical film 1B according to the present embodiment achieves the same advantageous effects as the embodiments described above and performs the optical function based on the optical function layer 20.

<Fourth Embodiment>

A fourth embodiment of the present invention will be described with reference to FIG. 4. In the following description, components that are common to those described above are denoted by the same reference signs, and duplicated description thereof will be omitted.

Figure 4:
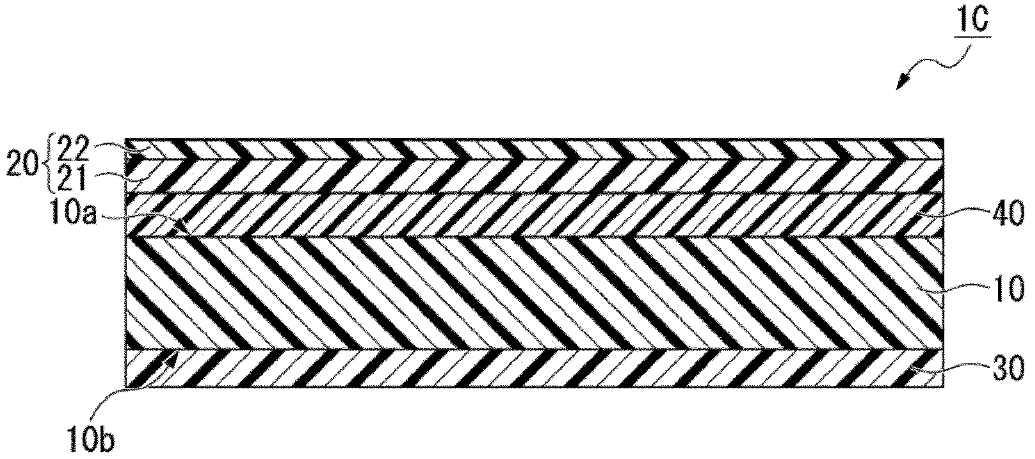
FIG. 4 is a schematic cross-sectional view of an optical film 1C according to a fourth embodiment of the present invention.

FIG. 4 is a schematic cross-sectional view of an optical film 1C according to the present embodiment illustrating the layer structure. The optical film 1C includes the transparent substrate 10, the optical function layer 20, which is formed on the side close to the first surface 10*a* of the substrate 10, and the colored layer 30, which is formed on the second surface 10*b* of the substrate 10. The optical film 1C includes an oxygen barrier layer 40 and the optical function layer 20, which is formed on the oxygen barrier layer 40. The optical function layer 20 includes the hardcoat layer 21 and the low refractive index layer 22, which is formed on the hardcoat layer 21.

The oxygen barrier layer 40 is a transparent layer having light transmittance and has an oxygen permeability of preferably 10 cc/(m2·day·atm) or less, more preferably 5 cc/(m2·day·atm) or less, and even more preferably 1 cc/(m2·day·atm) or less. The material for forming the oxygen barrier layer 40 preferably includes, for example, polyvinyl alcohol (PVA), an ethylene vinyl alcohol copolymer (EVOH), vinylidene chloride, or a siloxane resin and may be, for example, Maxive (registered trademark) manufactured by Mitsubishi Gas Chemical Company, Inc., EVAL manufactured by Kuraray, or PVDC latex or PVDC resin manufactured by Asahi Kasei Corporation. The oxygen barrier layer 40 has a thickness that is not limited to a particular thickness and only needs to have a thickness that achieves desired oxygen barrier properties.

Furthermore, inorganic particles (particles formed of an inorganic compound) may be dispersed in the oxygen barrier layer 40. The inorganic particles further reduce oxygen permeability and inhibit oxidation degradation (fading) of the colored layer 30. The size and content of the inorganic particles are not limited to a particular size or content and only need to be set as required in accordance with, for example, the thickness of the oxygen barrier layer 40. The size (maximum length) of the inorganic particles dispersed in the oxygen barrier layer 40 is preferably less than the thickness of the oxygen barrier layer 40, and the smaller the size, the more advantageous it is. Note that, the size of the inorganic particles dispersed in the oxygen barrier layer 40 may be either uniform or non-uniform. Examples of the inorganic particles dispersed in the oxygen barrier layer 40 include, specifically, silica particles, alumina particles, silver particles, copper particles, titanium particles, zirconia particles, and tin particles.

In the present embodiment, the number and position of oxygen barrier layers 40 may be set as required. The oxygen barrier layer 40 only needs to be laminated above the colored layer 30 closer to the observer's side. For example, the oxygen barrier layer 40 may be located between the substrate 10 and the colored layer 30, or on the second surface 10*b* of the substrate 10. The oxygen barrier layer 40 may further be located between the substrate 10 and the antiglare layer 23 in the optical films 1A and 1B according to the second and third embodiments. The oxygen barrier layer 40 may further be located between the antiglare layer 23 and the low refractive index layer 22 in the optical film 1B according to the third embodiment. Additionally providing the oxygen barrier layer 40 further inhibits the fading of the colorant due to oxidation caused by, for example, light rays and heat under the influence of oxygen in external air as in the fourth embodiment.

The optical film 1C is manufactured by forming the oxygen barrier layer 40 on the first surface 10*a* of the substrate 10, sequentially forming the hardcoat layer 21 and the low refractive index layer 22 on the oxygen barrier layer 40, and forming the colored layer 30 on the second surface 10*b* of the substrate 10.

In the case in which the optical film 1C according to the present embodiment is mounted on the display device as described above, oxygen contained in the external air cannot reach the colored layer without permeating through the oxygen barrier layer 40. This inhibits degradation of the coloring material by, for example, light rays and heat under the influence of the oxygen in the external air, and maintains the color correction function for a long time.

For example, another oxygen barrier layer may further be provided between the colored layer 30 and the substrate 10, and the substrate 10 may be sandwiched between the oxygen barrier layers.

In the present invention, the optical function layer 20 does not necessarily have to be configured as described above.

Examples of the optical function layer 20 of the present invention also include an antireflection layer in which multiple low refractive index layers 22 and multiple high refractive index layers are combined, an antireflection layer including a high refractive index layer and the antiglare layer 23, an antireflection layer including a high refractive index layer, the antiglare layer 23, and the low refractive index layer 22, and an antireflection layer including the antiglare layer 23. Furthermore, at least one of the high refractive index layer, the antiglare layer 23, and the low refractive index layer 22 may have antistatic properties, and at least one of the high refractive index layer, the antiglare layer 23, and the low refractive index layer 22 may have antifouling properties. For example, an antistatic agent may be added to the high refractive index layer and the antiglare layer 23 so as to impart antistatic properties. The antifouling properties may be imparted to the function of the low refractive index layer 22 by adding a material having water repellency and/or oil repellency to the low refractive index layer 22. The antifouling properties may be imparted to the high refractive index layer or the antiglare layer 23. Note that, both antistatic properties and antifouling properties may be imparted to at least one of the high refractive index layer, the antiglare layer 23, and the low refractive index layer 22. This imparts an additional function to the optical function layer.

The resin used for the composition for forming the high refractive index layer may be the active energy ray-curable resin described for the hardcoat layer 21. This improves the scratch resistance of the optical film in addition to the function that prevents reflection.

EXAMPLES

The optical film according to the present invention will be described in further detail using Examples and Comparative Examples. The present invention should not be limited in any way by the specific content of the following examples.

Examples 1 to 17 and Comparative Examples 1 to 14

In the following Examples and Comparative Examples, optical films 1 to 24 having layer structures shown in Tables 1 and 2 were prepared, and the properties of the prepared films were evaluated. Optical properties of OLED display devices 1 to 7 that include optical films 7, 13, 14, and 21 to 24 shown in Table 3 were checked by simulation.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|
| Optical film | Optical film 1 | Optical film 2 | Optical film 3 | Optical film 4 | Optical film 5 | Optical film 6 | Optical film 7 | Optical film 8 | Optical film 9 | Optical film 10 | Optical film 11 | Optical film 12 | Optical film 13 | Optical film 14 |
| Functional layer 1 | | Low refractive index layer 1 | — | Low refractive index layer 1 | Low refractive index layer 1 | Low refractive index layer 1 | Low refractive index layer 1 | Low refractive index layer 1 | Low refractive index layer 1 | Low refractive index layer 1 | Low refractive index layer 1 | Low refractive index layer 1 | Low refractive index layer 1 | Low refractive index layer 1 |
| Functional layer 2 | Hard coat layer 2 | Hard coat layer 2 | Anti-glare layer 1 | Anti-glare layer 1 | Hard coat layer 2 | Hard coat layer 2 | Hard coat layer 2 | Hard coat layer 2 | Hard coat layer 2 | Hard coat layer 2 | Hard coat layer 2 | Hard coat layer 1 | Hard coat layer 2 | Hard coat layer 2 |
| Functional layer 3 | — | — | — | — | — | — | — | — | — | — | Oxygen barrier layer 1 | | — | — |

TABLE 1-continued

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 |
|---|---|---|---|---|---|---|---|---|---|---|---|---|---|---|
| Substrate | TAC | TAC | TAC | TAC | TAC | TAC | TAC | PMMA 1 | PET1 | PET2 | TAC | TAC | TAC | TAC |
| Colored layer | Colored layer 1 | Colored layer 1 | Colored layer 1 | Colored layer 1 | Colored layer 5 | Colored layer 2 | Colored layer 3 | Colored layer 3 | Colored layer 3 | Colored layer 3 | Colored layer 3 | Colored layer 5 | Colored layer 6 | Colored layer 7 |

TABLE 2

| | Comp. Ex. 1 | Comp. Ex. 2 | Comp. Ex 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| Optical film | Optical film 15 | Optical film 16 | Optical film 17 | Optical film 18 | Optical film 19 | Optical film 20 | Optical film 21 | Optical film 22 | Optical film 23 | Optical film 24 |
| Functional layer 1 | Low refractive index layer 1 | Low refractive index layer 1 | Low refractive index layer 1 | Low refractive index layer 1 | Low refractive index layer 1 | Low refractive index layer 1 | Low refractive index layer 1 | Low refractive index layer 1 | Low refractive index layer 1 | Low refractive index layer 1 |
| Functional layer 2 | Hard coat layer 2 | Hard coat layer 2 | Hard coat layer 2 | Hard coat layer 3 | Hard coat layer 2 | Hard coat layer 2 | Hard coat layer 1 | Hard coat layer 2 | Hard coat layer 2 | Hard coat layer 2 |
| Functional layer 3 | Colored layer 1 | Colored layer 4 | — | — | — | — | — | — | — | — |
| Substrate | TAC | TAC | PMMA2 | TAC | PMMA2 | PMMA2 | TAC | TAC | TAC | TAC |
| Colored layer | — | — | Colored layer 1 | Colored layer 1 | Colored layer 6 | Colored layer 7 | — | Colored layer 8 | Colored layer 9 | Colored layer 10 |

TABLE 3

| | Ex. 15 | Ex. 16 | Ex. 17 | Comp. Ex. 11 | Comp. Ex. 12 | Comp. Ex. 13 | Comp. Ex. 14 |
|---|---|---|---|---|---|---|---|
| OLED display device | Display device 1 | Display device 2 | Display device 3 | Display device 4 | Display device 5 | Display device 6 | Display device 7 |
| Optical film | Optical film 7 | Optical film 13 | Optical film 14 | Optical film 21 | Optical film 22 | Optical film 23 | Optical film 24 |
| Functional layer 1 | Low refractive index layer 1 | Low refractive index layer 1 | Low refractive index layer 1 | Low refractive index layer 1 | Low refractive index layer 1 | Low refractive index layer 1 | Low refractive index layer 1 |
| Functional layer 2 | Hard coat layer 2 | Hard coat layer 2 | Hard coat layer 2 | Hard coat layer 1 | Hard coat layer 2 | Hard coat layer 2 | Hard coat layer 2 |
| Substrate | TAC | TAC | TAC | TAC | TAC | TAC | TAC |
| Colored layer | Colored layer 3 | Colored layer 6 | Colored layer 7 | — | Colored layer 8 | Colored layer 9 | Colored layer 10 |

<Preparation of Optical Film>

A method for forming each layer will be described below.

[Formation of Colored Layer]

(Materials of Composition for Forming Colored Layer

The materials used for the composition for forming the colored layer as listed below were used. Note that, the characteristic values of the maximum absorption wavelength and the half width of the coloring materials were calculated from the spectral transmittance in the cured coated film.

First Coloring Material:

Dye-1 A pyrromethene cobalt complex dye (maximum absorption wavelength of 493 nm, half width of 26 nm), represented by Chemical Formula 1, which will be described below.

Second Coloring Material:

Dye-2 Tetraazaporphyrin copper complex dye (FDG-007 manufactured by YAMADA CHEMICAL CO., LTD., maximum absorption wavelength of 595 nm, half width of 22 nm)

Dye-3 Tetraazaporphyrin copper complex dye (PD-311S manufactured by Yamamoto Chemicals, Inc., maximum absorption wavelength of 586 nm, half width of 22 nm)

Third Coloring Material:

Dye-4 Phthalocyanine copper complex dye (FDN-002 manufactured by YAMADA CHEMICAL CO., LTD., maximum absorption wavelength of 800 nm (the wavelength with the lowest transmittance is 800 nm in the wavelength range of 400 to 800 nm))

Other than first to third coloring materials:

Dye-5 Dye (FDG-003 manufactured by YAMADA CHEMICAL CO., LTD., maximum absorption wavelength of 545 nm, half width of 79 μm)

Dye-6 Dye (FDG-004 manufactured by YAMADA CHEMICAL CO., LTD., maximum absorption wavelength of 575 nm, half width of 63 μm)

Additives:

Hindered amine photostabilizer, Chimassorb 944FDL (manufactured by BASF Japan, molecular weight of 2000 to 3100)

Hindered amine photostabilizer, Tinuvin 249 (manufactured by BASF Japan, molecular weight of 482)

Singlet oxygen quencher D1781 (manufactured by Tokyo Chemical Industry Co., Ltd., dialkyldithiocarbamate nickel complex)

Ultraviolet Absorber:

Tinuvin 479 (manufactured by BASF Japan, maximum absorption wavelength of 322 nm)

LA-36 (manufactured by ADEKA CORPORATION, maximum absorption wavelengths of 310 nm, 350 nm)

Active Energy Ray-Curable Resin:

UA-306H (manufactured by Kyoeisha Chemical Co., Ltd., pentaerythritol triacrylate hexamethylene diisocyanate urethane prepolymer)

DPHA (dipentaerythritol hexaacrylate)

PETA (pentaerythritol triacrylate)

Initiator (photoinitiator):

Omnirad TPO (manufactured by IGM Resing B. V., absorption wavelength peaks at 275 nm, 379 nm)

Solvent:

MEK (methyl ethyl ketone)

Methyl acetate

[Chemical Formula 1]

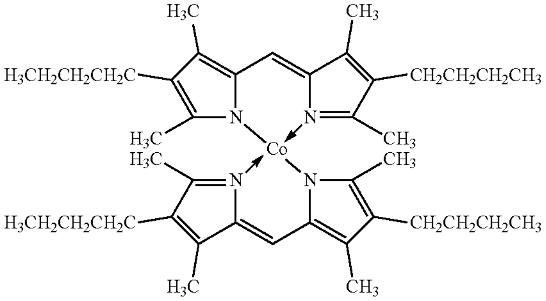

(Formation of Colored Layer)

(Substrate)

The following transparent substrates were used.

TAC: triacetylcellulose film (TG60UL manufactured by FUJIFILM Corporation, substrate thickness of 60 μm, ultraviolet shielding rate of 92.9%)

PMMA1: poly methyl methacrylate film (W001U80 manufactured by Sumitomo Chemical Co., Ltd., substrate thickness of 80 μm, ultraviolet shielding rate of 93.4%)

PMMA2: poly methyl methacrylate film (W002N80 manufactured by Sumitomo Chemical Co., Ltd., substrate thickness of 80 μm, ultraviolet shielding rate of 13.9%)

PET1: polyethylene terephthalate film (SRF manufactured by TOYOBO CO., LTD., substrate thickness of 80 μm, ultraviolet shielding rate of 88.3%)

PET2: polyethylene terephthalate film (TOR20 manufactured by SKC, substrate thickness of 40 ultraviolet shielding rate of 88.6%)

The composition for forming the colored layer shown in Table 4 was applied to one side of the transparent substrate, followed by drying in an oven at 80° C. for 60 seconds. Subsequently, the coated film was irradiated with ultraviolet light using an ultraviolet irradiation device (manufactured by Fusion UV Systems Japan K.K., light source H-bulb) at an amount of radiation exposure of 150 mJ/$cm^2$ to be cured so that the film thickness after curing is adjusted to 5.0 μm. In this manner, the colored layers 1 to 10 were formed. Note that, the added amount is in mass ratio.

TABLE 4

| | | Colored layer 1 | Colored layer 2 | Colored layer 3 | Colored layer 4 | Colored layer 5 | Colored layer 6 | Colored layer 7 | Colored layer 8 | Colored layer 9 | Colored layer 10 |
|---|---|---|---|---|---|---|---|---|---|---|---|
| Colorant | First coloring material | | | Dye-1 | | | | — | Dye--1 | — | |
| | Added amount | 0.2% | 0.2% | 0.2% | 0.2% | 0.2% | 0.1% | — | 0.2% | — | |
| | Second coloring material | — | | | | | | Dye-2 | Dye-3/ Dye-2 = 60/40 | — | |
| | Added amount | — | | | | | | 0.2% | 0.5% | — | |
| | Third coloring material | — | | | | | Dye-4 | — | — | — | |
| | Added amount | — | | | | | 1.5% | — | — | — | |
| | Fourth coloring material | — | | | | | | | | Dye-5 | Dye-6 |
| | Added amount | — | | | | | | | | 0.2% | 0.2% |
| Additive | Type | — | Chimassorb 944FDL | Chimassorb 944FDL/ D1781 | — | Tinuvin 249 | — | — | Chimassorb 944FDL/ D1781 | — | |
| | Ratio | — | 100 | 67/33 | — | 100 | — | — | 67/33 | — | |
| | Added amount | — | 1.4% | 2.2% | — | 1.4% | — | — | 3.2% | — | |
| Ultraviolet absorber | Type | | — | | Tinuvin 479/LA36 | | | | — | | |
| | Ratio | | — | | 40/60 | | | | — | | |
| | Added amount | | — | | 3.20% | | | | — | | |

TABLE 4-continued

| | | Colored layer 1 | Colored layer 2 | Colored layer 3 | Colored layer 4 | Colored layer 5 | Colored layer 6 | Colored layer 7 | Colored layer 8 | Colored layer 9 | Colored layer 10 |
|---|---|---|---|---|---|---|---|---|---|---|---|
| Active energy ray-curable resin | Type | UA-306H/DPHA/PETA | | | | | | | | | |
| | Ratio | 70/20/10 | | | | | | | | | |
| | Added amount | 45.2% | 43.8% | 43.0% | 42.0% | 43.8% | 43.8% | 45.2% | 41.5% | 45.2% | 45.2% |
| Photoinitiator | Type | Omnirad TPO | | | | | | | | | |
| | Added amount | 4.6% | | | | | | | | | |
| Solvent | Type | MEK/methyl acetate | | | | | | | | | |
| | Ratio | 50/50 | | | | | | | | | |
| | Added amount | 50% | | | | | | | | | |

[Formation of Oxygen Barrier Layer]

Composition for Forming Oxygen Barrier Layer:

PVA117 (manufactured by Kuraray) 80% aqueous solution (Formation of Oxygen Barrier Layer)

The composition for forming the oxygen barrier layer was applied to the transparent substrate and dried to form the oxygen barrier layer 1 shown in Table 1 having an oxygen permeability of 1 cc/(m2·day·atm).

[Formation of Optical Function Layer]

(Composition for Forming Hardcoat Layer)

The materials used for the composition for forming the hardcoat layer as listed below were used.

Ultraviolet Absorber:

Tinuvin 479 (manufactured by BASF Japan, maximum absorption wavelength of 322 nm)

LA-36 (manufactured by ADEKA CORPORATION, maximum absorption wavelengths of 310 nm, 350 nm)

Active Energy Ray-Curable Resin:

UA-306H (manufactured by Kyoeisha Chemical Co., Ltd., pentaerythritol triacrylate hexamethylene diisocyanate urethane prepolymer)

DPHA (dipentaerythritol hexaacrylate)

PETA (pentaerythritol triacrylate)

Initiator:

Omnirad TPO (manufactured by IGM Resins B. V., absorption wavelength peaks at 275 nm, 379 nm)

Omnirad 184 (manufactured by IGM Resins B. V., absorption wavelength peaks at 243 nm, 331 nm)

Solvent:

MEK (methyl ethyl ketone)

Methyl acetate (Formation of Hardcoat Layer)

The compositions for forming the hardcoat layer shown in Table 5 were applied to the transparent substrate or the oxygen barrier layer and were then dried in an oven at 80° C. for 60 seconds. Subsequently, the coated films were irradiated with ultraviolet light using an ultraviolet irradiation device (manufactured by Fusion UV Systems Japan K.K., light source H-bulb) at an amount of radiation exposure of 150 mJ/cm$^2$ to be cured. In this manner, the hardcoat layers 1 to 3 shown in Tables 1 and 2 having a film thickness of 5.0 μm after curing were formed. Note that, the hardcoat layers 1 and 3 containing the ultraviolet absorber also serve as ultraviolet shielding layers.

TABLE 5

| | | Hard coat layer 1 | Hard coat layer 2 | Hard coat layer 3 |
|---|---|---|---|---|
| UV absorber | Type | Tinuvin 479/ LA36 | — | Tinuvin 479/ LA36 |
| | Ratio | 40/60 | — | 40/60 |
| | Added amount | 3.2% | — | 3.2% |
| Active energy ray-curable resin | Type | UA-306H/DPHA/PETA | | |
| | Ratio | 70/20/10 | | |
| | Added amount | 42.2% | 45.4% | 42.2% |
| Photoinitiator | Type | Omnirad TPO | | Omnirad 184 |
| | Added amount | 4.6% | | |
| Solvent | Type | MEK/methyl acetate | | |
| | Ratio | 50/50 | | |
| | Added amount | 50.0% | | |

(Composition for Forming Antiglare Layer)

The following composition for forming the antiglare layer was used.

Active Energy Ray-Curable Resin:

Light acrylate PE-3A (manufactured by Kyoeisha Chemical Co., Ltd., refractive index of 1.52)

Photoinitiator;

Omnirad TPO (manufactured by IGM Resins B. V., absorption wavelength peaks at 275 nm, 379 nm)

Organic Particulate:

Styrene-methyl methacrylate copolymer particles (refractive index of 1.515, average particle size of 2.0 μm)

Inorganic particulate 1:

Synthetic smectite

Inorganic particulate 2:

Alumina nanoparticles, average particle size of 40 nm

Solvent

Toluene

Isopropyl alcohol

[Formation of Antiglare Layer]

The composition for forming the antiglare layer shown in Table 6 was applied to the transparent substrate or the hardcoat layer on the layer structure shown in Table 1 and was then dried in an oven at 80° C. for 60 seconds. Subsequently, the coated film was irradiated with ultraviolet light using an ultraviolet irradiation device (manufactured by Fusion UV Systems Japan K.K. light source H-bulb) at an amount of radiation exposure of 150 mJ/cm$^2$ to be cured. In this manner, the antiglare layer shown in Table 1 having a film thickness of 5.0 μm after curing was formed.

TABLE 6

| | | Antiglare layer 1 |
|---|---|---|
| Active energy ray-curable resin | Type | PE-3A |
| | Ratio | 100 |
| | Added amount | 43.70% |
| Organic particulate | Type | Styrene-methyl methacrylate copolymer particles |
| | Added amount | 0.5% |
| Inorganic particulate | Type | Synthetic scmetite/alumina nanoparticles |
| | Ratio | 20/80 |
| | Added amount | 1.25% |
| Photo-initiator | Type | Omnirad TPO |
| | Added amount | 4.55% |
| Solvent | Type | Toluene/isopropyl alcohol |
| | Ratio | 30/70 |
| | Added amount | 50% |

(Composition for Forming Low Refractive Index Layer)

The materials used as listed below were used as the composition for forming the low refractive index layer.

Refractive Index Modifier:

Porous silica particulate dispersion liquid (average particle size of 75 nm, solid content of 20%, solvent methyl isobutyl ketone) 8.5 parts by mass Antifouling Property Imparting Agent:

Optool AR-110 (manufactured by DAIKIN INDUSTRIES, LTD., solid content of 15%, solvent methyl isobutyl ketone) 5.6 parts by mass

| Active energy ray-curable resin: | |
|---|---|
| pentaerythritol triacrylate | 0.4 parts by mass |
| Initiator: | |
| Omnirad 184 (manufactured by IGM Resins B. V.) | 0.07 parts by mass |
| Leveling agent: | |
| RS-77 (manufactured by DIC) | 1.7 parts by mass |
| Solvent: | |
| methyl isobutyl ketone | 83.73 parts by mass |

(Formation of Low Refractive Index Layer)

The composition for forming the low refractive index layer having the above composition was applied to the hardcoat layer or the antiglare layer and was then dried in an oven at 80° C. for 60 seconds. Subsequently, the coated film was irradiated with ultraviolet light using an ultraviolet irradiation device (manufactured by Fusion UV Systems Japan K.K., light source H-bulb) at an amount of radiation exposure of 200 $mJ/cm^2$ to be cured. In this manner, the low refractive index layers shown in Tables 1 and 2 having a film thickness of 100 nm after curing were formed.

[Evaluation of Film Properties]

(Ultraviolet Shielding Rate)

The ultraviolet shielding rate of the ultraviolet shielding layer (ultraviolet absorbing layer) of the optical film was measured. In the measurement of the ultraviolet shielding rate of the ultraviolet shielding layer (ultraviolet absorbing layer) formed on the substrate of the optical film, a cellophane tape in compliance with the adhesion test of JIS-K5600 was used to peel the ultraviolet shielding layer from the colored layer to transfer a single layer of the ultraviolet shielding layer on the cellophane tape. The ultraviolet shielding layer (ultraviolet absorbing layer) of the optical film is a layer of the optical film that is able to absorb ultraviolet light and is, for example, the transparent substrate, the hardcoat layers 1 and 3, or the colored layer 4. The ultraviolet shielding layer (ultraviolet absorbing layer) included in each optical film is shown in Tables 7 and 8.

The transmittance of the single layer of ultraviolet shielding layer was measured using an automatic spectrophotometer (U-4100 manufactured by Hitachi, Ltd.), and an average transmittance of the ultraviolet region (290 to 400 nm) was calculated. Note that, when the single layer of ultraviolet shielding layer was transferred to the cellophane tape, the average transmittance was calculated with reference to part of the cellophane tape without the ultraviolet shielding layer. Using the obtained average transmittance, the ultraviolet shielding rate represented by Expression (2) was calculated.

$$\text{Ultraviolet shielding rate (\%)}=100-\text{average transmittance (\%) of ultraviolet region (290 to 400 nm)} \quad (2)$$

(Pencil Hardness Test)

A pencil hardness test according to JIS-K5400-1990 that is performed using a pencil (manufactured by MITSUBISHI PENCIL CO., LTD., pencil hardness H) at a load of 500 g was conducted on the surface of the optical film using a Clemens type scratch hardness tester (HA-301 manufactured by Tester Industry Co., Ltd.). The change in the appearance caused by a scratch was visually evaluated. It was evaluated as PASS when no scratching was observed and FAIL when scratching was observed.

(Lightfastness Test)

As a reliability test of the optical film, a moisture and heat resistance test was conducted on each optical film including the obtained colored layer using a xenon weatherometer (X75 manufactured by Suga Test Instruments Co., Ltd.) under conditions of a xenon lamp illuminance of 60 $W/cm^2$ (300 to 400 nm) and a temperature of 45° C. and a humidity of 50% RH in the tester for 120 hours. The transmittance was measured before and after the test using the automatic spectrophotometer (U-4100 manufactured by Hitachi, Ltd.) to calculate a transmittance difference $\Delta T\lambda$ between before and after the test with the wavelength $\lambda$ exhibiting the minimum transmittance in the absorption wavelength ranges of the first to third coloring materials and the color difference $\Delta E^*ab$ under illuminant C between before and after the test. The closer the transmittance difference and the color difference are to zero, the better. The color difference preferably satisfies $\Delta E^*ab \leq 5$.

[Evaluation of Display Device Properties]

In the following Examples 15 to 17 and Comparative Examples 11 to 14, the properties of the display devices including the obtained optical films 7, 13, 14, and 21 to 24 were evaluated by simulation as follows. In the simulation, the display device was configured by bonding the optical film to an OLED display device (object).

Figure 7:
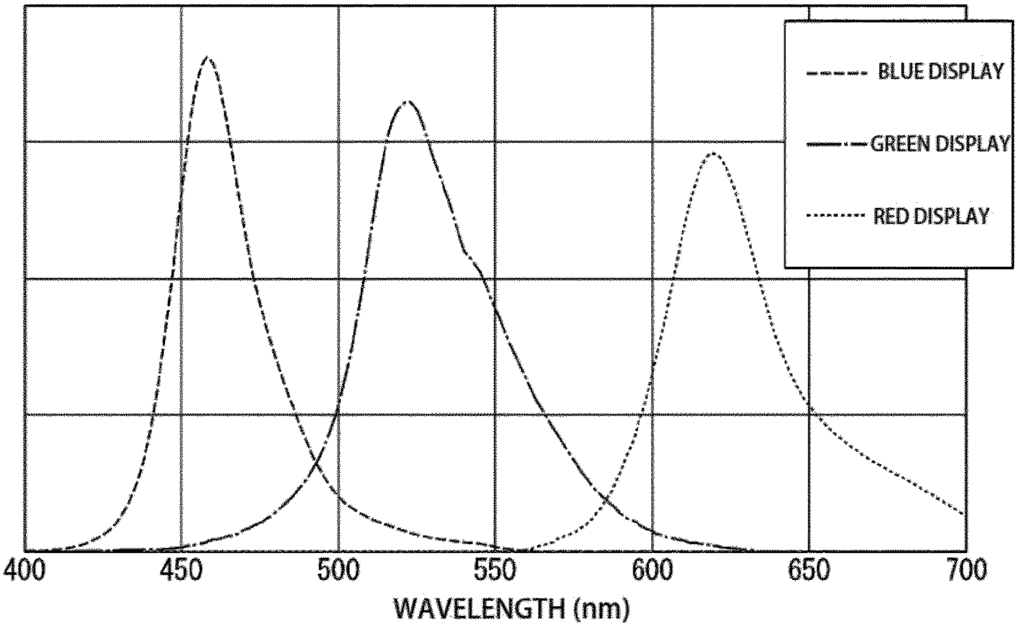
FIG. 7 shows spectra of light sources used for evaluation of color reproducibility.

Note that the OLED display device, which is the object to which the optical film is bonded, exhibits the spectrum shown in FIG. 6 during white display, and individual spectra as shown in FIG. 7 during red display, green display, and blue display.

(Transmission Properties (Transmission Properties During White Display))

The transmittance of the obtained optical film was measured using the automatic spectrophotometer (U-4100 manufactured by Hitachi, Ltd.). The transmittance of the optical film was multiplied by the single spectrum during white display of the OLED display device without the optical film as shown in FIG. 6 to calculate the spectrum after transmission through the optical film. The single spectrum during white display of the OLED display device and the spectrum after transmission through the optical film were each multiplied by the luminous efficiency function to calculate a Y-value. The ratio when the Y-value obtained from the single spectrum during white display of the OLED display device is regarded as 100 represents the efficiency, which was used as an index for evaluating the transmission properties of the display device.

(Color Reproducibility)

The transmittance of the obtained optical film was measured using the automatic spectrophotometer (U-4100 manufactured by Hitachi, Ltd.). The transmittance of the optical film was multiplied by the individual spectra during red display, green display, and blue display of the OLED display device without the optical film as shown in FIG. 7 to calculate the chromaticity (x, y) of each of monochromatic red, green, and blue colors according to the Commission International de l'Eclairage (CIE) 1931 color system after transmission through the optical film. Subsequently, a triangle formed by connecting the chromaticities of the obtained monochromatic red, green, and blue colors was compared with a triangle formed by connecting the primaries of DCI-P3 proposed by Digital Cinema Initiatives (DCI), that is, red (x=0.680, y=0.320), green (x=0.265, y=0.690), blue (x=0.150, y=0.060) and a triangle formed by connecting the primaries of Adobe RGB standard proposed by Adobe Systems (refer to JP 2011-17963A), that is, red (x=0.640, y=0.330), green (x=0.210, y=0.710), blue (x=0.150, y=0.060). From the comparison, the overlap area was obtained to calculate the coverage ratio according to each standard, which was used as an index for evaluating color reproducibility.

As the evaluation of the optical film properties of the optical films 1 to 20 shown in Tables 1 and 2, the ultraviolet shielding rate of the ultraviolet shielding layer (ultraviolet absorbing layer), pencil hardness, and results of the light-fastness test are shown in Tables 7 and 8.

TABLE 7

| | | Ex. 1 | Ex. 2 | Ex. 3 | Ex. 4 | Ex. 5 | Ex. 6 | Ex. 7 |
|---|---|---|---|---|---|---|---|---|
| Optical film | | Optical film 1 | Optical film 2 | Optical film 3 | Optical film 4 | Optical film 5 | Optical film 6 | Optical film 7 |
| Ultraviolet absorbing layer | | Substrate TAC | Substrate TAC | Substrate TAC | Substrate TAC | Substrate TAC | Substrate TAC | Substrate TAC |
| Ultraviolet shielding rate | | 93.0% | 93.0% | 93.0% | 93.0% | 93.0% | 93.0% | 93.0% |
| Pencil hardness | | PASS | PASS | PASS | PASS | PASS | PASS | PASS |
| Colored layer light fastness | ΔTλ | 12.8 | 13.0 | 12.1 | 13.2 | 11.7 | 9.0 | 7.4 |
| | ΔEab | 3.6 | 3.6 | 3.3 | 3.6 | 3.3 | 2.8 | 2.6 |

| | | Ex. 8 | Ex. 9 | Ex. 10 | Ex. 11 | Ex. 12 | Ex. 13 | Ex. 14 |
|---|---|---|---|---|---|---|---|---|
| Optical film | | Optical film 8 | Optical film 9 | Optical film 10 | Optical film 11 | Optical film 12 | Optical film 13 | Optical film 14 |
| Ultraviolet absorbing layer | | Substrate PMMA1 | Substrate PET1 | Substrate PET2 | Substrate TAC | Substrate TAC | Substrate TAC | Substrate TAC |
| Ultraviolet shielding rate | | 93.5% | 88.5% | 88.8% | 93.0% | 91.4% | 93.0% | 93.0% |
| Pencil hardness | | PASS | PASS | PASS | PASS | PASS | PASS | PASS |
| Colored layer light fastness | ΔTλ | 7.6 | 8.0 | 8.1 | 6.1 | 9.7 | 10.1 | 4.0 |
| | ΔEab | 2.6 | 2.7 | 2.7 | 1.5 | 2.3 | 4.0 | 0.7 |

TABLE 8

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Optical film | Optical film 15 | Optical film 16 | Optical film 17 | Optical film 18 | Optical film 19 | Optical film 20 |
| Ultraviolet absorbing layer | — | Colored layer 4 | Substrate PMMA2 | Hard coat layer 3 | Substrate PMMA2 | Substrate PMMA2 |
| Ultraviolet shielding rate | — | — | 19.6% | 90.5% | 19.6% | 19.6% |

TABLE 8-continued

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Pencil hardness | | PASS | PASS | PASS | FAIL | PASS | PASS |
| Colored light fastness layer | ΔTλ | 65.9 | 65.4 | 67.0 | 13.5 | 17.8 | 41.2 |
| | ΔEab | 12.6 | 12.5 | 13.0 | 3.6 | 5.1 | 8.0 |

The optical films of Examples 1 to 14 include the colored layer and the transparent substrate, which is located above the colored layer and is capable of absorbing ultraviolet light. As shown in Tables 7 and 8, the ultraviolet shielding rate of the layer that is located above the colored layer and is capable of absorbing ultraviolet light is 85% or higher.

According to the results shown in Tables 7 and 8, the colored layer has poor lightfastness in the case in which the colored layer is located above the substrate and no ultraviolet shielding layer is provided as in Comparative Example 1, or in the case in which the substrate does not have a function of absorbing ultraviolet light as in Comparative Examples 3, 5, and 6, or in the case in which the colored layer includes a function of absorbing ultraviolet light as in Comparative Example 2. Compared with these Comparative Examples, since the optical film including the colored layer according to the present invention includes, above the colored layer, the transparent substrate having an ultraviolet shielding rate of 85% or higher, the lightfastness of the colored layer is significantly improved. The result of Comparative Example 2 shows that it is difficult to improve the lightfastness even if the ultraviolet absorber is added to the colored layer. As above, providing the colored layer with the ability to absorb ultraviolet light has only a small advantageous effect, and another layer needs to be formed above the colored layer.

The lightfastness is further improved by additionally laminating the oxygen barrier layer or adding, in the colored layer, a high-molecular-weight hindered amine photostabilizer as the radical scavenger or a dialkyldithiocarbamate nickel complex as the singlet oxygen quencher. Note that, the results of the lightfastness of the optical films including the colored layers 2, 3, and 5 show that one or both of the hindered amine photostabilizer and the singlet oxygen quencher may be added.

The decision on the pencil hardness was "PASS" in all the Examples. In Comparative Example 4 having the hardcoat layer 3, the decision on the pencil hardness was "FAIL". This is probably because the absorption wavelength peak of the initiator in the hardcoat layer 3 overlaps with the absorption wavelength of the ultraviolet absorber.

The hardcoat layer 1 included in Example 12 is an ultraviolet shielding layer formed of the active energy ray-curable resin containing the ultraviolet absorber. Both the ultraviolet shielding ability and the hardness were achieved by having different absorption wavelength bands between the ultraviolet absorber and the photoinitiating material.

The results of the transmission property during white display and the color reproducibility obtained through simulation are shown in Table 9 as the evaluation of the properties of the display devices 1 to 7 including the optical films 7, 13, 14, and 21 to 24.

TABLE 9

| | | Ex. 15 | Ex. 16 | Ex. 17 | Comp. Ex. 11 | Comp. Ex. 12 | Comp. Ex. 13 | Comp. Ex. 14 |
|---|---|---|---|---|---|---|---|---|
| Optical film | | Display device 1 Optical film 7 | Display device 2 Optical film 13 | Display device 3 Optical film 14 | Display device 4 Optical film 21 | Display device 5 Optical film 22 | Display device 6 Optical film 23 | Display device 7 Optical film 24 |
| Maximum absorption wavelength (T < 50%) | | 493 nm | 800 nm | 595 nm | — | 493 nm 589 nm | 545 nm | 575 nm |
| Transmittance@ Maximum absorption wavelength (T < 50%) | | 26.3% | 11.2% | 23.2% | — | 26.3% 19.5% | 48.1% | 48.4% |
| Evaluation of property during white display | | 75 | 70 | 77 | 92 | 61 | 75 | 73 |
| Evaluation of color reproducibility | DCI coverage ratio | 92% | 91% | 90% | 88% | 94% | 88% | 89% |
| | Adobe RGB coverage ratio | 91% | 92% | 96% | 93% | 98% | 89% | 96% |

The results shown in Table 9 show that the display device to which the optical film including the colored layer according to the present invention is adhered exhibits a DCI standard coverage ratio of 90% or higher and has improved color reproducibility compared with Comparative Example 11 without the colored layer. In particular, the DCI chromaticity coverage ratio was significantly improved in Example 15 in which the absorption in the wavelength band of the first coloring material is great. The transmission properties during white display are low in Comparative Example 12 in which the absorption is strong in multiple wavelength bands of the first coloring material and the second coloring material. This shows that when multiple kinds of coloring materials are included in the colored layer, the transmittance of only one of the maximum absorption wavelengths of the coloring materials is preferably 1% or higher and less than 50%. Additionally, the color reproducibility is ranked low in Comparative Examples 13 and 14 including coloring material whose wavelength range and half width do not comply with the specification. In contrast, Examples 15 to 17 were excellent in transmission properties during white display in addition to presenting a certain color correction function.

Embodiments of the present invention have so far been described in detail with reference to the drawings. However, specific configurations are not limited to these embodiments. The present invention should encompass modifications, combinations, or the like of these embodiments, in the range not departing from the spirit of the present invention.

For example, the colored layer 30 may be formed of the composition for forming the colored layer containing the active energy ray-curable resin, the photoinitiator, at least one of coloring materials including the first to third coloring materials, the additive, and the solvent.

In particular, the colored layer 30 may be formed of the active energy ray-curable resin listed as the composition for the hardcoat layer 21 in the first embodiment and the coloring material. This enables enhancing the scratch resistance to be enhanced and good color correction function of the colored layer 30 to be maintained. Furthermore, this configuration enhances the scratch resistance of the object to which the optical film is attached.

For example, a desired function may be imparted by providing one or more other layers on the optical film of the present invention. Examples of the other layer include an antistatic layer and an antifouling layer.

[Reference Signs List] 1, 1A, 1B, 1C Optical film; 10 Substrate (transparent substrate); 10*a* First surface; 10*b* Second surface; 20 Optical function layer; 21 Hardcoat layer; 22 Low refractive index layer; 23 Antiglare layer; 30 Colored layer; 40 Oxygen barrier layer.

What is claimed is:

1. An optical film, comprising:

a sheet-like substrate having an ultraviolet shielding rate of 85% or higher according to JIS L 1925, the substrate having a first surface and a second surface opposite the first surface;

an optical function layer formed to face the first surface of the substrate; and a colored layer formed to face the second surface of the substrate and including a colorant, wherein a difference ΔE*ab between chromaticities before and after a lightfastness test in which the optical film is irradiated with a xenon lamp with an illuminance of 60 $W/cm^2$ at a wavelength of 300 to 400 nm for 120 hours under conditions including a temperature of 45° C. and a humidity of 50% RH satisfies following Expression (1):

$$\Delta E^*ab \leq 5 \qquad \text{Expression (1),}$$

the colorant included in the colored layer comprises:

(A) a first coloring material that is a pyrromethene cobalt complex dye having a maximum absorption wavelength in a range of 470 to 530 nm and an absorption spectrum half width of 15 to 26 nm, and (B) at least one of a second coloring material having a maximum absorption wavelength in a range of 560 to 620 nm and an absorption spectrum half width of 15 to 55 nm, and a third coloring material in which a wavelength having the lowest transmittance in a wavelength range of 400 to 800 nm is in a range of 650 to 800 nm, and the colorant includes absorption wavelength bands one of which has a transmittance of 1% or higher and less than 50%.

2. The optical film of claim 1, wherein the optical film includes a surface having a pencil hardness H or higher at a load of 500 g.

3. The optical film of claim 1, wherein the colored layer includes one or more of a radical scavenger, a peroxide decomposer, and a singlet oxygen quencher.

4. The optical film of claim 3, wherein the radical scavenger is a hindered amine photostabilizer having a molecular weight of 2,000 or more.

5. The optical film of claim 3, wherein the singlet oxygen quencher is a transition metallic complex of dialkyl phosphate, dialkyl dithiocarbamate, or benzenedithiol or similar dithiol.

6. The optical film of claim 1, wherein the colorant included in the colored layer includes one or more compounds selected from a group consisting of compounds having any of a porphyrin structure, merocyanine structure, phthalocyanine structure, azo structure, cyanine structure, squarylium structure, coumarin structure, polyene structure, quinone structure, tetraazaporphyrin structure, pyrromethene structure, and indigo structure and their metal complexes.

7. The optical film of claim 1, further comprising an oxygen barrier layer having an oxygen permeability of 10 $cc/(m^2 \cdot day \cdot atm)$ or less, the oxygen barrier layer being disposed between the substrate and the colored layer or disposed to face the second surface of the substrate.

8. The optical film of claim 1, wherein the optical function layer includes at least one of an antireflection layer including a high refractive index layer and a low refractive index layer, an antireflection layer including the high refractive index layer and an antiglare layer, an antireflection layer including the high refractive index layer, the antiglare layer, and the low refractive index layer, and an antireflection layer including the antiglare layer.

9. The optical film of claim 8 wherein at least one of the high refractive index layer, the antiglare layer, and the low refractive index layer further has antistatic properties, and at least one of the high refractive index layer, the antiglare layer, and the low refractive index layer further has antifouling properties.

10. The optical film of claim 1, further comprising an antistatic layer or an antifouling layer.

11. A display device comprising:

a light source; and the optical film of claim 1 disposed in such a manner that the second surface of the substrate faces the light source.

12. The optical film of claim 1, wherein ΔE*ab≤3.6.

13. A composition for forming a colored layer, the composition comprising:

an active energy ray-curable resin;

a photoinitiator;

a colorant;

an additive; and a solvent, wherein the colorant comprises:

(A) a first coloring material that is a pyrromethene cobalt complex dye having a maximum absorption wavelength in a range of 470 to 530 nm and an absorption spectrum half width of 15 to 26 nm, and (B) at least one of a second coloring material having a maximum absorption wavelength in a range of 560 to 620 nm and an absorption spectrum half width of 15 to 55 nm, and a third coloring material in which a wavelength having the lowest transmittance in a wavelength range of 400 to 800 nm is in a range of 650 to 800 nm, the colorant includes absorption wavelength bands one of which has a transmittance of 1% or higher and less than 50%, and the colorant includes, as an additive, one or more of a radical scavenger, a peroxide decomposer, and a singlet oxygen quencher.

14. An optical film, comprising:

a sheet-like substrate having an ultraviolet shielding rate of 85% or higher according to JIS L 1925, the substrate having a first surface and a second surface opposite the first surface, the substrate consists a material selected from the group consisting of polymethylmethacrylate (PMMA), triacetylcellulose (TAC) and polyethylene terephthalate (PET);

an optical function layer formed to face the first surface of the substrate; and a colored layer formed to face the second surface of the substrate and including a colorant, wherein a difference ΔE*ab between chromaticities before and after a lightfastness test in which the optical film is irradiated with a xenon lamp with an illuminance of 60 $W/cm^2$ at a wavelength of 300 to 400 nm for 120 hours under conditions including a temperature of 45° C. and a humidity of 50% RH satisfies following Expression (1):

$$\Delta E^*ab \leq 5 \quad \text{Expression (1)},$$

the colorant included in the colored layer includes at least one of a first coloring material having a maximum absorption wavelength in a range of 470 to 530 nm and an absorption spectrum half width of 15 to 45 nm, a second coloring material having a maximum absorption wavelength in a range of 560 to 620 nm and an absorption spectrum half width of 15 to 55 nm, and a third coloring material in which a wavelength having the lowest transmittance in a wavelength range of 400 to 800 nm is in a range of 650 to 800 nm, and the colorant includes absorption wavelength bands one of which has a transmittance of 1% or higher and less than 50%.

15. The optical film of claim 1, wherein ΔE*ab≤3.3.

16. The optical film of claim 14, wherein ΔE*ab≤3.6.

17. The optical film of claim 14, wherein ΔE*ab≤3.3.

* * * * *